United States Patent
Simpson

(10) Patent No.: US 7,420,506 B2
(45) Date of Patent: Sep. 2, 2008

(54) CUMULANT-BASED DISCRIMINATOR FOR GNSS CODE ALIGNMENT

(75) Inventor: Robert G. Simpson, Ellicott City, MD (US)

(73) Assignee: Honeywell International Inc., Morristown, NJ (US)

( * ) Notice: Subject to any disclaimer, the term of this patent is extended or adjusted under 35 U.S.C. 154(b) by 26 days.

(21) Appl. No.: 11/466,916

(22) Filed: Aug. 24, 2006

(65) Prior Publication Data

US 2007/0115172 A1  May 24, 2007

Related U.S. Application Data

(60) Provisional application No. 60/738,278, filed on Nov. 18, 2005.

(51) Int. Cl.
*G01S 1/00* (2006.01)
*G01S 5/14* (2006.01)
*H04B 1/00* (2006.01)

(52) U.S. Cl. .............. 342/357.12; 342/357.14; 375/141; 375/142; 375/148; 375/150

(58) Field of Classification Search ................ 342/357.01–357.017
See application file for complete search history.

(56) References Cited

U.S. PATENT DOCUMENTS

| 4,975,926 | A * | 12/1990 | Knapp .................... 375/141 |
| 6,160,841 | A * | 12/2000 | Stansell et al. .......... 375/148 |
| 6,208,295 | B1 * | 3/2001 | Dogan et al. ............. 342/378 |
| 2001/0053177 | A1 * | 12/2001 | Papasakellariou ........ 375/142 |
| 2004/0189525 | A1 * | 9/2004 | Beadle et al. ............ 342/451 |
| 2004/0198381 | A1 * | 10/2004 | Siegel et al. ........... 455/456.1 |
| 2004/0202235 | A1 * | 10/2004 | Kohli et al. ............. 375/150 |
| 2004/0208236 | A1 * | 10/2004 | Fenton .................... 375/148 |
| 2007/0109188 | A1 * | 5/2007 | Zimmerman et al. ... 342/357.14 |

OTHER PUBLICATIONS

Abramowitz et al., "Probability Functions", Handbook of Mathematical Functions, 1972, pp. 927-928, Publisher: Dover Publications Inc.

Irsiger et al., "Comparison of Multipath Mitigation Techniques With Consideration of Future Signal Structures", Ion GPS/GNSS 2003, Sep. 9, 2003, pp. 2584-2592, Published in: Portland, OR.

Liu et al., "Research of Signal Processing Method About Vehicle Positioning", Vehicle Electronics Conference, 1999. Proceedings of the IEEE International Changchun, China Sep. 6-9, 1999, Piscataway, NJ, Sep. 6, 1999, pp. 319-322, Publisher: IEEE, Published in: US.

\* cited by examiner

*Primary Examiner*—Thomas H. Tracza
*Assistant Examiner*—Harry Liu
(74) *Attorney, Agent, or Firm*—Black Lowe & Graham PLLC

(57) ABSTRACT

Systems and methods for a cumulant-based discriminator for global navigation satellite system code alignment are provided. In one embodiment, a method for determining a misalignment between a GNSS coarse acquisition code signal and a replica code is provided. The method comprises producing code samples of a spread spectrum signal received from a satellite; multiplying the code samples by a current value of a replica code; and calculating a set of multiple-order cumulants based on the code samples multiplied by the current value of the replica code.

20 Claims, 7 Drawing Sheets

CUMULANT-BASED DISCRIMINATOR FOR GNSS CODE ALIGNMENT

CROSS REFERENCES TO RELATED APPLICATIONS

This application is related to, and claims priority based on the following co-pending United States patent applications, which is are hereby incorporated herein by reference:

U.S. provisional patent application Ser. No. 60/738,278 entitled "CUMULANT-BASED DISCRIMINATOR FOR GNSS CODE ALIGNMENT"), filed Nov. 18, 2005 and which is referred to here as the '278 Application.

BACKGROUND

Accurate alignment of a locally generated code replica with a coarse acquisition signal arriving from a satellite in a Global Navigation Satellite System (GNSS) is critical for precise position determination. This alignment process becomes more difficult when the received coarse acquisition signal contains not only a direct path signal, but also additional multipath signals. Conventional correlator-based methods for maintaining this alignment are pulled away from the desired alignment when multipath is present. In modern GNSS receivers, this multipath-induced error often proves to be the dominant error that limits the precision of the GNSS position solution. Improved methods for accomplishing this signal alignment that reduce or eliminate this shortcoming of present methods would enable improved accuracy in GNSS position estimates for a wide variety of applications, including GNSS-assisted aircraft landing systems, GNSS ground monitoring stations and GNSS receivers operating in urban settings with significant multipath.

For the reasons stated above and for other reasons stated below which will become apparent to those skilled in the art upon reading and understanding the specification, there is a need in the art for improved systems and methods for GNSS position solutions.

SUMMARY

The Embodiments of the present invention provide methods and systems for Cumulant-based Discriminator for GNSS Code Alignment and will be understood by reading and studying the following specification.

In one embodiment, a method for determining a misalignment between a GNSS coarse acquisition code signal and a replica code is provided. The method comprises producing code samples of a spread spectrum signal received from a satellite; multiplying the code samples by a current value of a replica code; and calculating a set of multiple-order cumulants based on the code samples multiplied by the current value of the replica code.

In another embodiment, a global navigation satellite system receiver system is provided. The receiver system comprises a receiver adapted to receive spread spectrum signals from a global navigation satellite system and produce code samples from the spread spectrum signals, wherein the code samples are based on a sequence of code chips of a first code epoch; a replica code generator adapted to output a replica code based on the sequence of code chips of the first code epoch; a code multiplier coupled to the receiver and adapted to receive the code samples from the receiver, the code multiplier further coupled to the replica code generator and adapted to receive a current code chip value from the replica code generator, wherein the code multiplier is further adapted to generate an output based on the product of the code samples and the current code chip value; and a cumulant processor adapted to calculate a set of multiple-order cumulants based on the output of the code multiplier.

In yet another embodiment, a global navigation satellite system receiver system is provided. The receiver system comprises means for producing code samples of a spread spectrum signal received from a satellite; means for generating a replica code; means for multiplying the code samples by a current value of the replica code, the means for multiplying responsive to the means for producing code samples and the means for generating the replica code; and means for calculating a set of multiple-order cumulants, the means for calculating a set of multiple-order cumulants responsive to the means for multiplying.

BRIEF DESCRIPTION OF THE DRAWINGS

Embodiments of the present invention can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention use a multiple-order cumulant process instead of correlators with various alignment delays to estimate the misalignment between a direct sequence spread spectrum signal received from a GNSS satellite and a local reference signal (referred to herein as the "replica code"). One example of a GNSS direct sequence spread spectrum signal used for illustrative purposes in this specification is the satellite coarse acquisition signal (referred to herein as a "C/A code" signal) generated by global positioning system (GPS) satellites. A recursive cumulant computation, explained in greater detail below, produces various cumulant orders for a single relative alignment between the received C/A code signal and the local replica code signal. For the C/A codes used in GPS systems, the C/A code comprises code chips of constant magnitude. Embodiments of the present invention provide equations for what the values of the multiple-order cumulants should be in the presence of a misalignment between the received C/A code signal and the local replica code signal. These equations are solved for the misalignment in terms of the observed cumulant values. Moreover, embodiments of the present invention enable a GNSS receiver to assume that a multipath signal is present and solve for the position of the direct path signal as well as any multipath signal that has a delay less than one code chip interval, relative to the direct path signal. Thus, embodiments of the present invention take into account the fact that multipath interference may be present and performs calculations that provide an estimate of the direct path alignment that is largely unaffected by the multipath signal. Initial simulations have shown multipath-induced errors are reduced by a factor of 10 or more when compared to correlator-based methods of the prior art.

Figure 1:
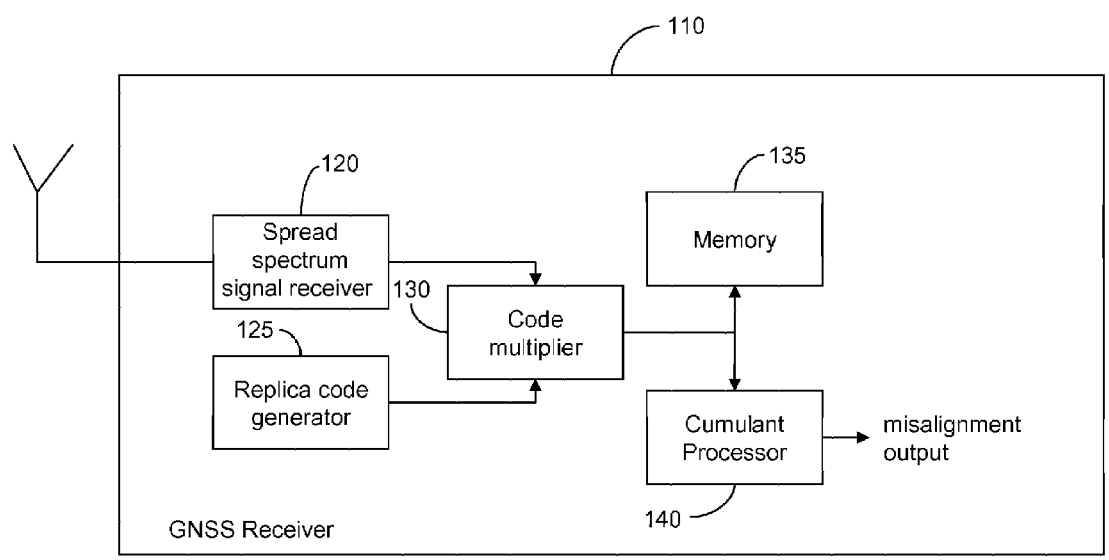
FIG. 1 is a block diagram illustrating a GNSS receiver of one embodiment of the present invention.

Illustrated in FIG. 1, a GNSS receiver 110 of one embodiment of the present invention comprises a spread spectrum signal receiver 120, a replica code generator 125, a code multiplier 130, a memory 135 and a cumulant processor 140. In alternate embodiments, each of spread spectrum signal receiver 120, replica code generator 125, code multiplier 130, memory 135 and cumulant processor 140, are implemented via integrated software or hardware components, or a combination thereof.

In operation, spread spectrum signal receiver 120 produces equally spaced sampled data (referred to herein as signal samples) of direct sequence spread spectrum signals arriving from GNSS satellites (not shown) in view of signal receiver 120. Because signal receiver 120 receives as input the additive combination of signals arriving from all GNSS satellites in view, signal receiver 120 will produce signal samples that include a sampling of direct sequence spread spectrum signals from the particular GNSS satellite of interest (not shown), a sampling of direct sequence spread spectrum signals from the other GNSS satellites, as well as samplings of any noise received by signal receiver 120. At the same time, replica code generator 125 produces a local replica code chip sequence that replicates a particular code chip sequence that GNSS receiver 110 expects to receive from the GNSS satellite of interest.

In one embodiment, the signal samples produced by spread spectrum signal receiver 120 include a sampling of a C/A code transmitted by a GPS satellite. As signal samples containing C/A code chip data are produced by spread spectrum signal receiver 120, each signal sample is multiplied by the current value of the locally generated replica code by code multiplier 130. In one embodiment the products of the signal sample and the current value of the locally generated replica code are stored into memory 135. Based on the output of code multiplier 130, cumulant processor 140 calculates a set of multiple-order cumulants and solves a set of alignment equations to determine a degree of misalignment between the C/A code transmitted by the GPS satellite and the replica code.

Figure 2:
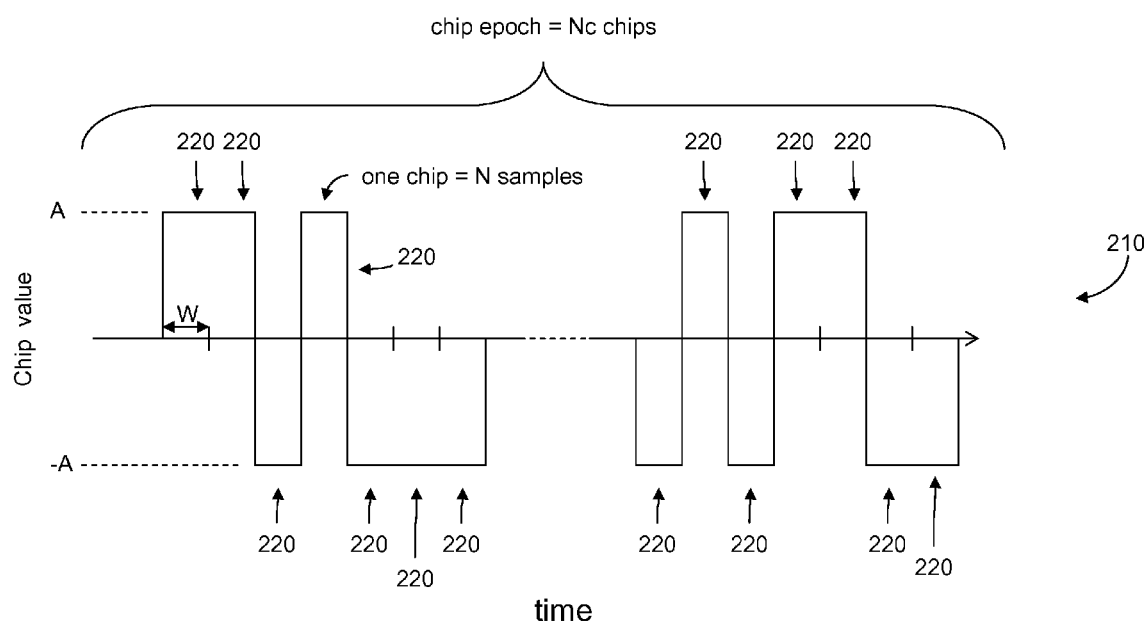
FIG. 2 is a graph illustrating a spread spectrum signal of one embodiment of the present invention.

A conventional C/A code chip sequence (an example of which is partially illustrated in FIG. 2 generally at 210) comprises a sequence of Nc chips (shown generally at 220) each having an equal absolute value (i.e., magnitude). Each chip in the C/A code chip sequence of FIG. 2 has the value of either A or −A. One cycle of the C/A code sequence contains Nc code chips and is referred to as a code epoch. The sequence of chip values in a C/A code is designed such that when a C/A code epoch is perfectly aligned with a replica of itself, and each chip of the C/A code epoch is multiplied by the value of the corresponding chip in the replica, and the products are summed across the entire code epoch, the resulting sum will obtain a maximum value. The C/A code and replica code are mutually orthogonal when they are out of alignment by more than one chip. In other words, the sequence of code chips is further designed such that when the C/A code and the replica code are out of alignment by more than one chip, and each chip of the C/A code epoch is multiplied by the corresponding misaligned chip of the replica code sequence, and the products are summed across the entire code epoch, the products will sum to a minimal value (i.e., a small value when compared to the maximum value). For example, a C/A code containing 1023 chips can include 511 chips of one sign to cancel out 511 chips of the other sign. This leaves one chip in the C/A code epoch left over. For GPS systems, a C/A code epoch is designed so that there is one more negative valued chip than there are positive value chips so that when the C/A code and the replica code are out of alignment by more than one chip, the result is a negative value 1023 times smaller in magnitude than when the C/A code and replica code are in perfect alignment.

Spread spectrum signal receiver 120 produces a sequence of equally space signal samples such that there are N samples per each chip of the C/A code signal. Thus it is possible for a C/A code chip received by spread spectrum signal receiver 120 to be misaligned with the replica code chip generated by replica code generator 125 by only a fraction of a chip (i.e., a misalignment of "n" samples where n<N). Further, the misalignment represented by "n" is not limited to an integral number of sample intervals, but can also include fractions of a sample such that n may take on the value of any real number. When the C/A code and replica code are misaligned by only a fraction of a chip, the products summed across the one or more code epochs will result in a value between the minimum and maximum value. This sum will vary linearly as a function of the degree of misalignment between the C/A code and the replica code.

In the conventional approach, correlators with various alignment delays essentially compute a dot product between the arriving signal samples and the local replica signal and estimate misalignment based on a linear relation between the computed result and the amount of misalignment. In contrast, embodiments of the present invention utilize a recursive process across intervals of data that are one chip wide to calculate a set of multiple-order cumulants. As opposed to the strictly linear relationship derived by correlators of the conventional approach, each of the multiple-order cumulants of the present invention, although calculated from the same set of signal samples, achieve different values from each other because each cumulant differs in the weighting given to earlier signal samples relative to later signal samples. No shifting of data is necessary to calculate each higher order cumulant.

In general, a set of cumulants of order zero to M can be calculated for an arbitrary data set by using a recursive progression such as:

$$ACC0 = ACC0 + s(k), \text{ then}$$

$$ACC1 = ACC1 + ACC0, \text{ then}$$

$$ACC2 = ACC2 + ACC1, \text{ then}$$

$$\ldots$$

$$ACCM = ACCM + ACCL, (\text{where } L = M-1)$$

where $s(k)$ is the k'th sample of a set of data containing K values. Accumulators ACC0 to ACCM increase in value as the recursive progression steps one sample at a time from $s(1)$ to $s(K)$. Mathematically identical results are obtained from the following summations:

$$ACC0 = \sum_{k=1}^{K} s(k)$$

$$ACC1 = \sum_{k=1}^{K} (K+1-k)s(k)$$

$$ACC2 = \sum_{k=1}^{K} \frac{(K+2-k)!}{2!(K-k)!} s(k)$$

$$\vdots$$

$$ACCM = \sum_{k=1}^{K} \frac{(K+M-k)!}{M!(K-k)!} s(k)$$

where the symbol ! is used to indicate the factorial operation such that $k! = k*(k-1)*(k-2)*\ldots*2*1$ with the special case $0!$ defined to be exactly 1. Regardless of which of these two methods are used for computing the cumulants, both provide exactly the same results for the values of the cumulants. The methods are mathematically identical in terms of the final result. The first method is more efficient computationally, while the second method can be more helpful in appreciating the information each cumulant is capturing and how embodiments of the present invention use a set of multiple-order cumulants from a single position of the local replica code relative to an arriving spread spectrum signal, rather than needing multiple positions as in the early/prompt/late correlation methods commonly used in the traditional approach for code alignment.

The non-recursive, summation-based definition of the cumulants described above reveals that a particular multiplicative weighting function is, in essence, applied to the data within each chip interval of the local replica code. This weighting function is particularly simple for the zero-order cumulant ACC0, where all data receives the same weight value of 1. For the first-order cumulant ACC1, this weighting function is largest for k=1, and then decreases linearly (i.e., as a first-order polynomial of the form W1=(N+1−k) ) as k increases to its ultimate value of N, the number of samples in a chip interval. For the second-order cumulant ACC2, the weighting function is largest for k=1, and then decreases as a function of a second order polynomial (W2=(N+1−k)(N+2−k)/2!) in k. For the third-order cumulant ACC3, the weighting function has a large value for k=1 and then monotonically decreases as a function of a third-order polynomial (W3=(N+1−k)(N+2−k)(N+3−k)/3!) in k, and so forth for higher-order cumulants. Note that with each increase in the order of the cumulant, the data corresponding to the larger values of the index k receive less weight relative to the data corresponding to the smaller values of the index k. It is this change in how the weighting is distributed across the data interval that causes the cumulants to be sensitive to the position of the code chip in the arriving signal within the interval associated with each code chip in the local replica code.

When the code chips in an arriving code signal happen to be exactly aligned with the code chips in the local replica code, s(k) will simply be a constant across the local replica chip interval, and the resulting cumulant will simply be the area under each of these weighting curves. If the arriving code signal is late with respect to the local code generator, there will be a boundary somewhere within the chip where the arriving and local replica codes are in alignment to the right of the boundary and out of alignment to the left of the boundary. The position of this boundary will be the same in each chip in the code epoch. Summed over all the chips, the out-of-alignment sections to the left of this boundary will interfere with one another and cancel out thanks to the orthogonality properties of the C/A code, while the in-alignment section to the right of this boundary will all add together with the same sign, producing a large signal. The net effect is that the cumulants will provide the integral of each of the weighting functions from the position of the boundary over to the right edge of the chips. Since the weighting functions for each order of cumulants are polynomials of different orders, these various integrals will have different values, and how they differ will depend on where the boundary is located.

Figure 3A:
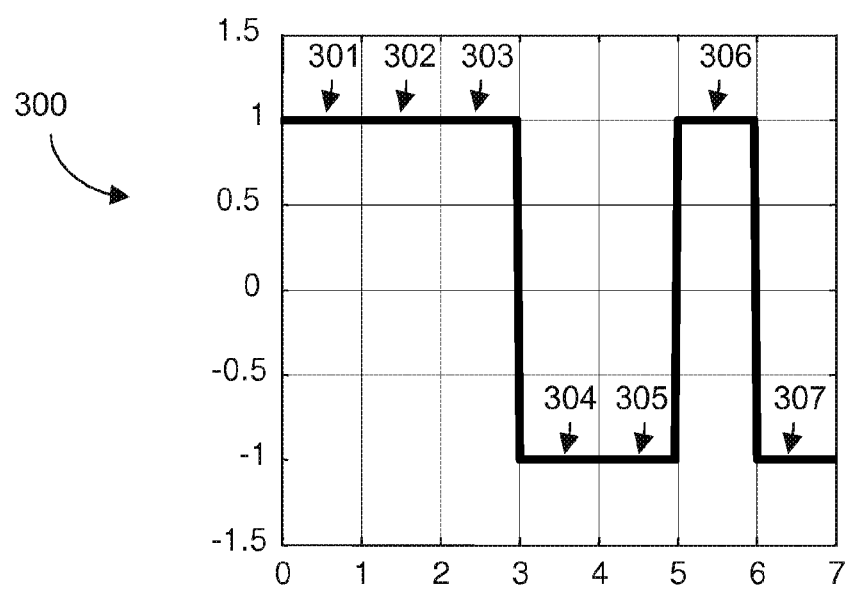
FIGS. 3A to 3D are graphs illustrating weighting functions for a set of multiple-order cumulants of one embodiment of the present invention.

To illustrate this point consider the pseudorandom code 300 shown in FIG. 3A. To simplify the figure for illustrative purposes, pseudorandom code 300 illustrates a code that is only 7 chips long (rather than 1023 chips long, for example). One of ordinary skill in the art upon studying this specification would appreciate that the following principles remain the same regardless of the number of chips. A first chip 301 occurs between the x-axis tick marks labeled 0 and 1. The second chip 302 occurs between the x-axis tick marks labeled 1 and 2, and so on. For this code, the first three chips (301, 302 and 303, respectively) have a value of 1, the fourth and fifth chips (304 and 305, respectively) have a value of −1, the sixth chip (306) has a value of 1 and the seventh chip (307) has a value of −1.

Figure 3B:
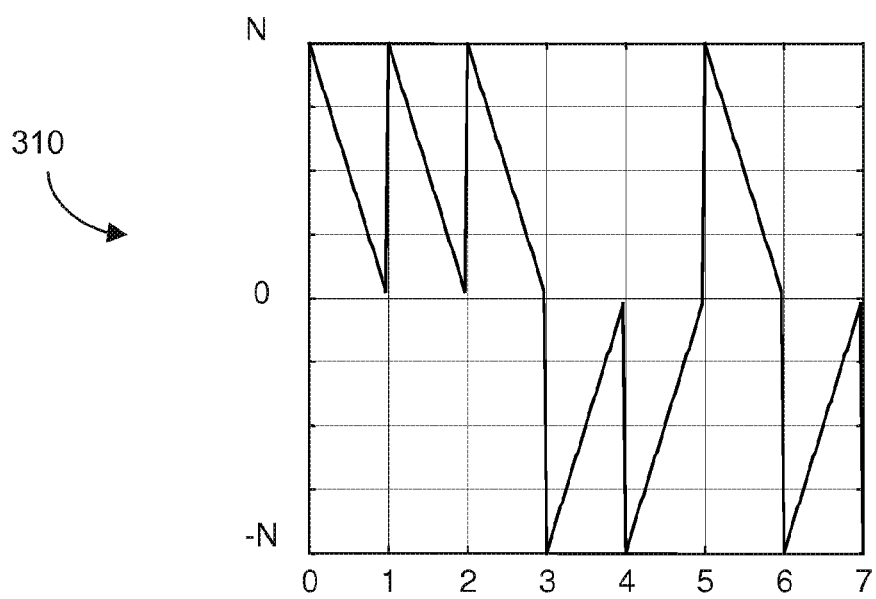
Figure 3C:
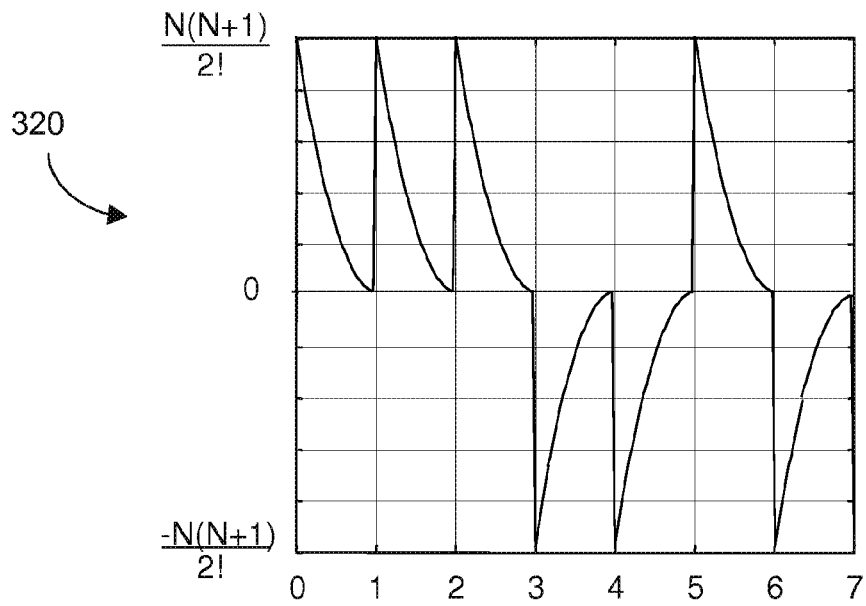
Figure 3D:
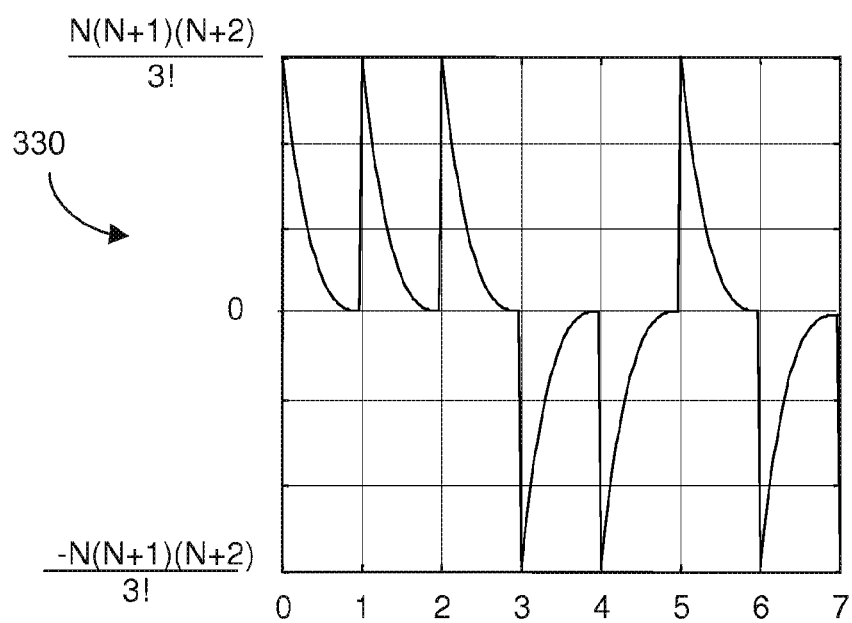

Because the weighting function for a zero-order cumulant is simply a constant, the combined effect of the local replica code and the effective weighting for the zero-order cumulant will also look exactly like the original pseudorandom code 300 shown in FIG. 3A, assuming zero misalignment. FIG. 3B shows generally at 310 the weighting for the first-order cumulant across the entire 7-chip code epoch of pseudorandom code 300. FIG. 3B illustrates the combined effect of the local replica code and the cumulant weighting function for the first-order cumulant. The recursive cumulant process that produces the first-order cumulant is mathematically equivalent to computing the dot product of waveform 310 with the C/A code in the arriving signal. FIG. 3C illustrates the combined effect of the local replica code and the cumulant weighting function for the second-order cumulant (shown generally at 320) and FIG. 3D illustrates the combined effect of the local replica code and the cumulant weighting function for the third-order cumulant (shown generally at 330). Because the shape of the weighting function within each code chip is different for the first-order, second-order and third order cumulants, we will get different values when we compute the dot product of each of these weighting functions with the arriving code, for the same shift between the arriving code and the local replica code. This means that for a single choice of the relative alignment between the arriving code and the local replica code, we will get different values for the various cumulants. The different behavior exhibited by the various weighting functions results in the various order cumulants capturing information about how well the arriving chips are lining up with our local code replica with just a single position of the local code replica relative to the arriving code. Because of this behavior, embodiments of the present invention are able to estimate any misalignment between the arriving code and the local code replica using data from the various order cumulants without having to introduce multiple local replica codes exhibiting different relative alignments with the arriving code. There is no need for early, prompt and late replica codes and their corresponding correlations with the arriving code.

Figure 4:
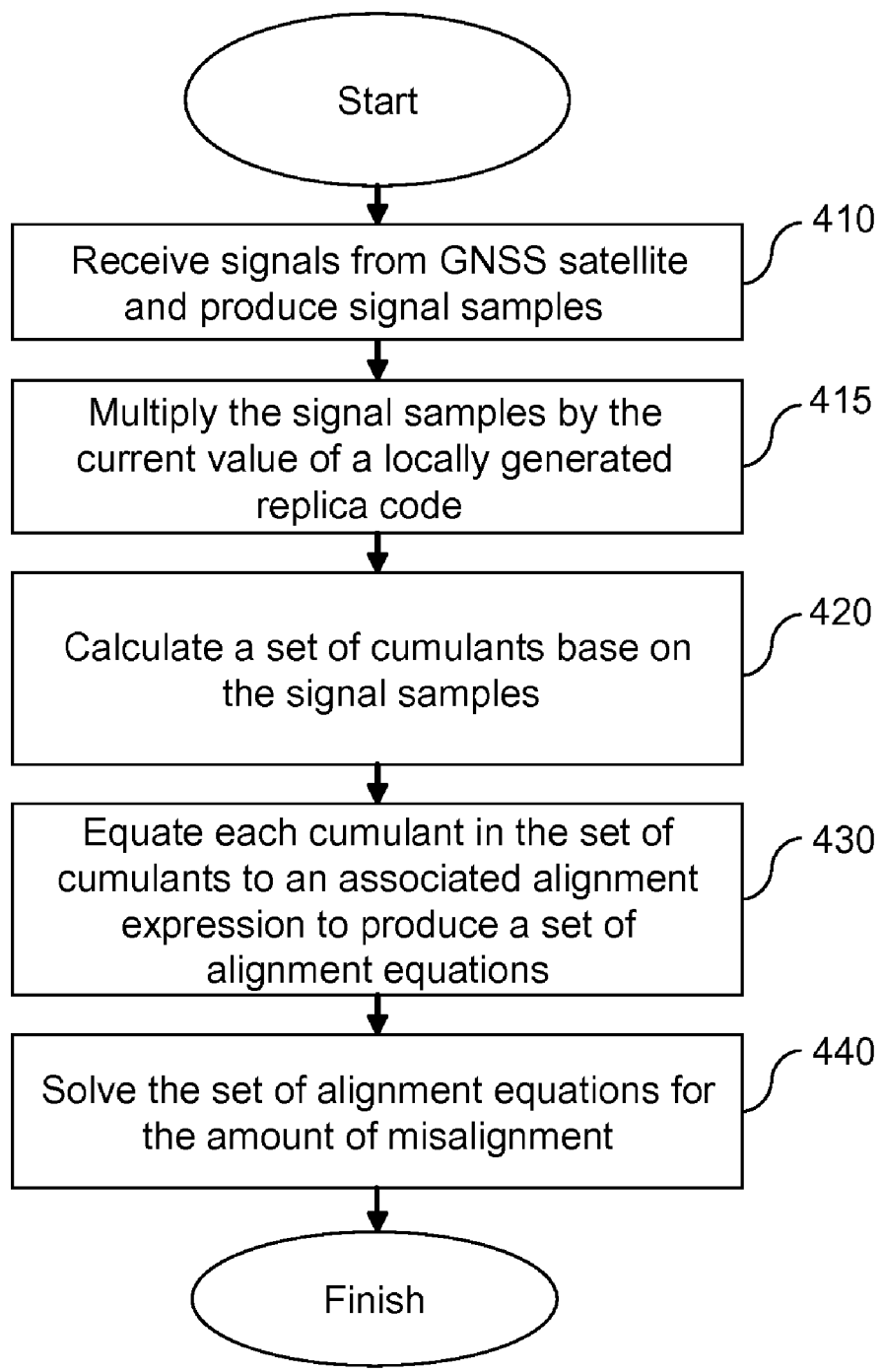
FIG. 4 is a flow chart illustrating a method of one embodiment of the present invention.

FIG. 4 is a flow chart illustrating a method for solving for the degree of misalignment between C/A code samples and a locally generated replica code of one embodiment of the present invention. A set of multiple-order cumulants is calculated that enables the finding of a solution for "n", the degree of misalignment between the received C/A code samples and the locally generated replica code. As is discussed in greater detail below, embodiments of the present invention provide a solution for "n" regardless of the presence of multi-path signal interference.

The method begins at 410 with receiving signals from a GNSS satellite and producing signal samples that include a sampling of a C/A code signal. Depending on the particular environment, the signal samples may include only a direct path C/A code signal component or comprise both a direct path C/A code signal component and a multipath C/A code signal component. The method proceeds to 415 with multiplying the signal samples by the current value of a locally generated replica code. As discussed above, misalignment between the C/A code and replica code by a fraction of a chip means that those misaligned samples have shifted into a region where they are mutually orthogonal to the replica code. The method proceeds to 420 with calculating a set of cumulants based on the signal samples. In one embodiment, calculating the set of cumulants includes performing a recursive cumulant computation based on the signal samples to produce a set of multiple-order cumulants. The method proceeds to 430 with equating each cumulant in the set of cumulants to an associated alignment expression to produce a set of alignment equations. The associated alignment expressions (discussed in greater detail below) are expressions describing what each of the cumulants in the set should equal in the presence of a misalignment between the received C/A code signal and the local replica code signal. Each alignment expression is at least partially a function of "n", the number of misaligned samples. The alignment equations are produced by equating each alignment expression with its corresponding cumulant. By equating each alignment expression with its corresponding cumulant, the resulting alignment equations can be solved for "n" using techniques known to those of ordinary skill in the art. The method proceeds to 440 with solving the set of alignment equations for the value of "n", which will provide the degree of misalignment between the received C/A code and the locally generated replica code in terms of the number of misaligned samples.

With knowledge of the misalignment between the received C/A code and the locally generated replica code, a GNSS receiver can identify the instance in time when the beginning of the C/A code was received thus enabling the GNSS receiver to calculate the distance between the GNSS receiver and a GNSS satellite using conventional time of arrival techniques. Further, in order for a code tracking loop of a GNSS receiver to establish and maintain code lock (another term for code alignment), the code tracking loop needs to know how far out of alignment the local replica code generator is relative to an arriving C/A code signal. Otherwise, the receiver does not know how much feedback correction to apply to achieve better code alignment.

As would be appreciated by one skilled in the art upon reading this specification, there are a number of algorithmic variations possible for calculating a set of cumulants of sufficient order to solve a set of alignment equations for the value of "n" as discussed with respect to block 440 of FIG. 4.

In embodiments of the present invention, cumulants are calculated based on the product of signal samples and the corresponding value of the local replica code across a one chip interval. In one embodiment, such as the method described with respect to FIG. 5, the above recursive progression is applied to contiguous, non-overlapping subsets of arriving data, wherein each subset includes N samples. The cumulant results for each subset are further combined to produce a final set of multiple-order cumulants. In another embodiment, such as the method described with respect to FIG. 6, a partial chip recovery process converts an entire code epoch of the received C/A code signal into the N values. The recursive progression is then applied to the N values. Given the same input, both methods will arrive at the same result.

The cumulants ACC0 to ACCM all have their greatest values when the C/A code signal and the local replica code are perfectly aligned. They decrease monotonically to small values as the misalignment approaches one chip interval. However, embodiments of the present invention do not rely on this behavior in order to determine the amount of misalignment. Instead, embodiments of the present invention take advantage of the relationships that exist between the various cumulant values, whatever the degree of alignment between the C/A code signal and the local replica code. These relationships are described in greater detail below and are attributable to the fact that the effective relative weighting of samples across a chip interval is different for the various cumulants, shown in FIGS. 3A to 3D. At the same time, it is true that signal to noise considerations will favor operation of the cumulant based discriminator with the misalignment between the arriving C/A code signal and the local replica code at some value less than or equal to half a chip interval. The smaller the misalignment, the better the performance will be in the presence of noise.

Figure 5:
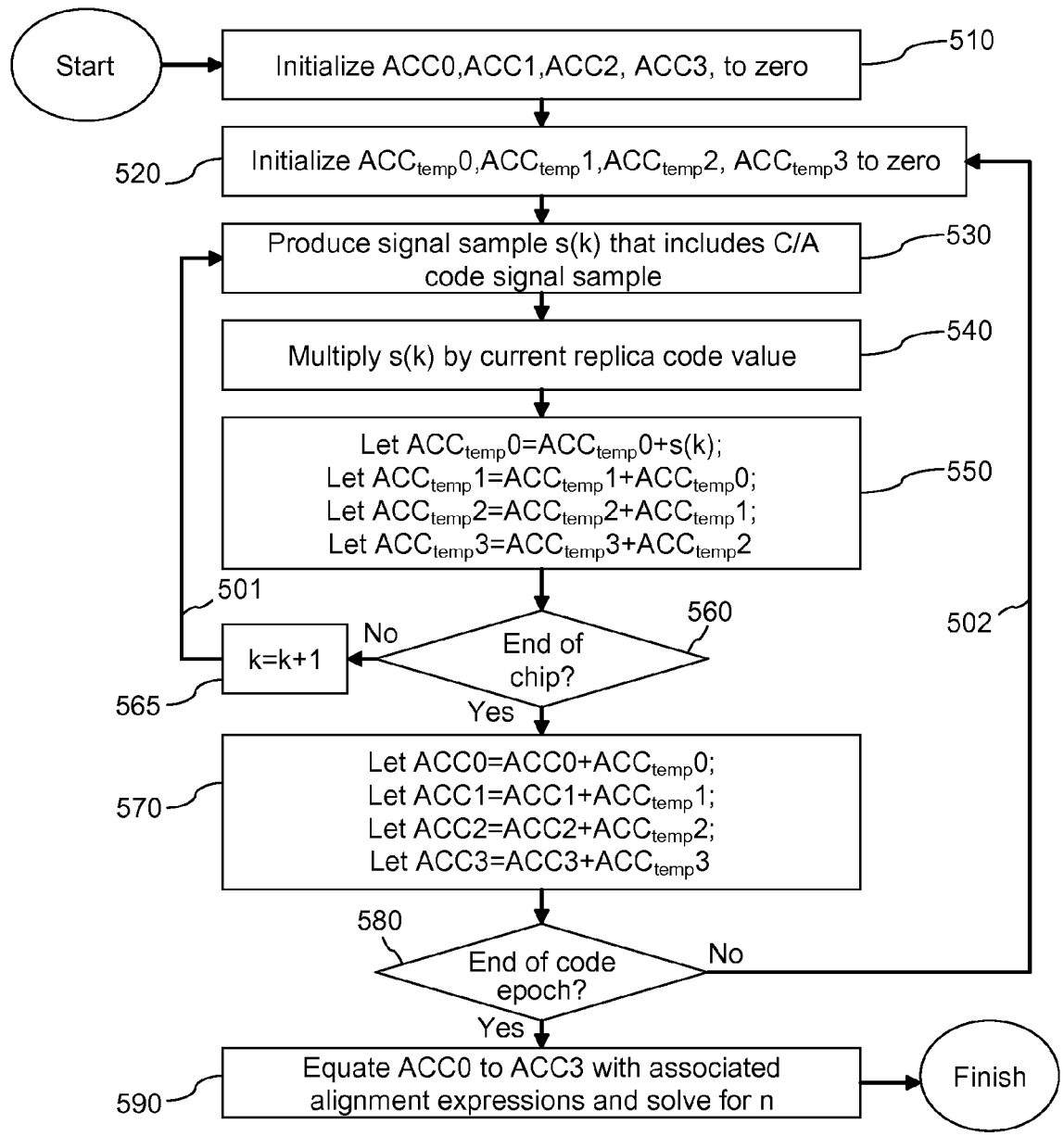
FIG. 5 is a flow chart illustrating a method of one embodiment of the present invention.
Figure 6:
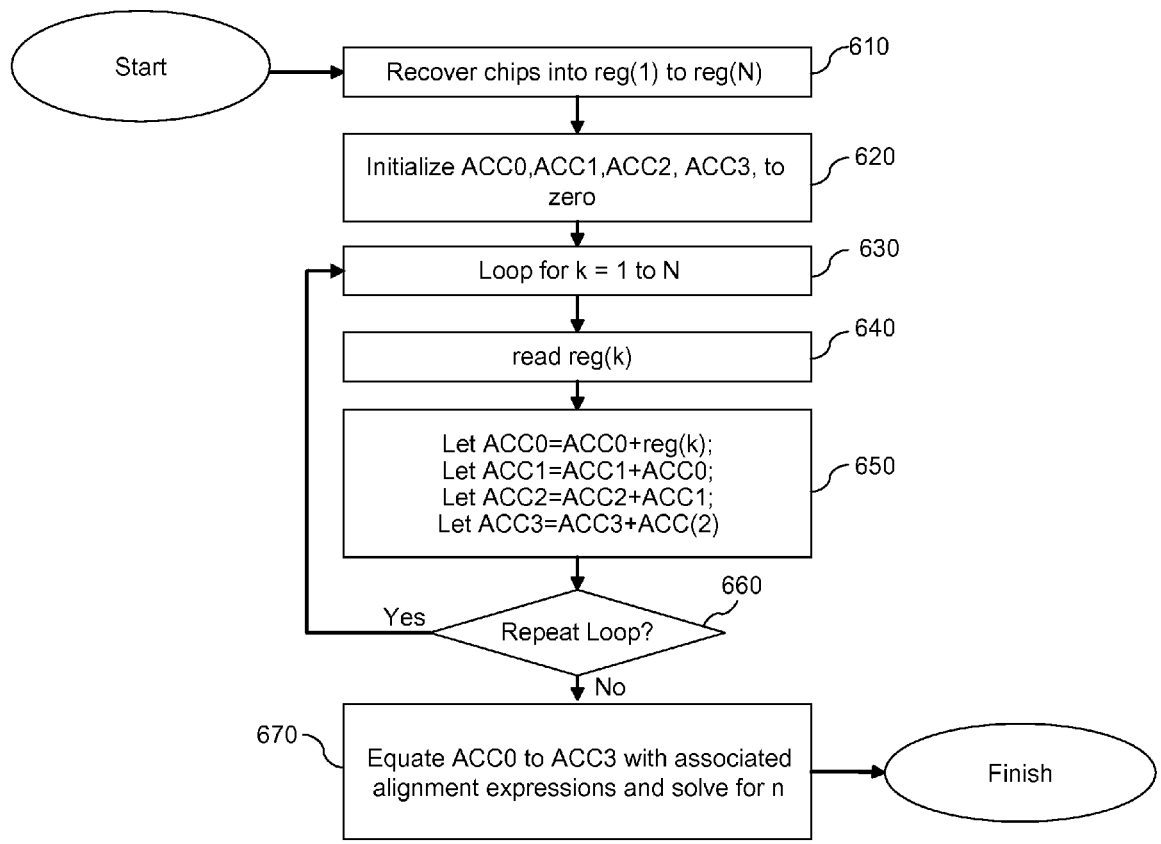
FIG. 6 is a flow chart illustrating a method of one embodiment of the present invention.

As mentioned previously, two algorithmic variations for generating a set of multiple-order cumulants are described with respect to the embodiments illustrated in FIG. 5 and FIG. 6.

FIG. 5 illustrates an embodiment of the present invention where the GNSS receiver processes the C/A code signal as it arrives by building up the several orders of cumulants as the signal samples are produced. This is in contrast to the embodiment illustrated below in FIG. 6, which includes a despreading of the C/A code from the GNSS satellite to recover the basic chip waveform. In the embodiment of FIG. 5, only one memory register is required for each order cumulant that needs to be computed. However, this method requires Nc·N·4 addition operations and Nc·N multiplication operations, as compared to the method of FIG. 6 which requires (Nc·N)+4·N addition operations and Nc·N multiplication operations per code epoch. As a result, the method of FIG. 5 requires a greater number of operations to compute the set of cumulants than does the method of FIG. 6.

The embodiment illustrated by the method of FIG. 5 calculates four orders of cumulants (ACC0, ACC1, ACC2, and ACC3), which for reasons described in greater detail below, is a sufficient number to solve for misalignment in terms of "n", either with or without the presence of a multi-path signal interference. Because the method of FIG. 5 builds up cumulants as each code sample is produced, this method utilizes temporary registers (variables $ACC_{temp}0$ to $ACC_{temp}3$) that build up value across each chip, and corresponding non-temporary registers (ACC0 to ACC3) that accumulate the value of the temporary registers at the end of each chip interval, as established by the local code replica.

As would be appreciated by one skilled in the art upon reading this specification, the beginning and ending of a chip received from a GNSS satellite cannot be identified by simply observing the resulting signal samples produced by spread spectrum signal receiver 120 alone. Similarly, there is no way to identify the beginning and ending of a code epoch by only observing code samples produced by spread spectrum signal receiver 120. The same is not true regarding the local replica code produced by replica code generator 125. Because replica code generator 125 is locally accessible within GNSS receiver 110, either inputs to replica code generator 125 (a clock signal for example) or alternate outputs produced by replica code generator 125 can be monitored to determine when replica code generator 125 begins transmitting a new chip within a code epoch, or when replica code generator 125 begins generating a new replica code epoch. By doing so, signal samples produced by signal receiver 120 can be subdivided based on timing derived from replica code generator 125.

The method begins at 510 with initializing final cumulant value variables ACC0 to ACC3 to an initial value of zero and then proceeds to 520 with initializing temporary variables $ACC_{temp}0$ to $ACC_{temp}3$ to an initial value of zero. The method then proceeds to 530 with producing a signal sample, s(k), that includes a sampling of a received C/A code signal. As discussed above, the signal sample s(k) may include both a direct signal component and a multi-path signal component. The method proceeds to 540 where the sample s(k) is multiplied by the current value of the replica code.

The method proceeds to 550 with calculating the value for temporary variables $ACC_{temp}0$ to $ACC_{temp}3$ based on the following recursive progression:

$ACC_{temp}0 = ACC_{temp}0 + s(k)$, then $ACC_{temp}1 = ACC_{temp}1 + ACC_{temp}0$, then $ACC_{temp}2 = ACC_{temp}2 + ACC_{temp}1$, then $ACC_{temp}3 = ACC_{temp}3 + ACC_{temp}2$ The method next proceeds to 560 to determine whether it has reached the end of a code chip. In one embodiment, as discussed above, the end of a code chip is assumed to be reached when the end of a chip in the local replica code is reached. In one embodiment, the timing for when a local replica code chip begins and ends is based on indicators provided by the local replica code generator. In other embodiments, other methods are used to determine when the end of a code chip is reached.

When block 560 determines that the last sample within a code chip has not been reached, the method proceeds to the next sample (indicated by block 565), returns to 530 to produce another sample s(k), and repeat blocks 540, 550 and 560.

When block 560 determines that last sample within of a replica code chip has been reached, the method proceeds with 570 and adds the values of $ACC_{temp}0$, $ACC_{temp}1$, $ACC_{temp}2$, and $ACC_{temp}3$ to the current values of cumulants ACC0, ACC1, ACC2, and ACC3, respectively.

The method next proceeds to 580 to determine whether it has processed the last chip in the code epoch. In one embodiment, as discussed above, the end of a code epoch is assumed to be reached when the end of a code epoch of the local replica code is reached. In other embodiments, other methods are used to determine when the end of the code epoch is reached.

When block 580 determines that last chip in the code epoch has not been reached, the method loops back to 520 with re-initializing each of temporary variables $ACC_{temp}0$ through $ACC_{temp}3$ to zero, and then proceeds to repeat blocks 530, 540, 550, 560 and 570. Although completion of the inner loop (501) of FIG. 5 only processes one chip interval of data at a time, the recursive progression continues to increment k across all of the samples in a complete code epoch from 1 to Nc*N, and does not reset k to a value of 1 when returning to 520 via outer loop (502).

When block 580 determines that last chip in the code epoch is reached, the final values of cumulants ACC0, ACC1, ACC2, and ACC3 become the final cumulant values. The method then proceeds to 590 to equate the final cumulant values to alignment expressions, and solve the resulting alignment equations for misalignment, n. In the case where there is no multipath signal interference (i.e., just a direct path signal is present), the values of final cumulants ACC0, ACC1, ACC2, and ACC3 will reflect a net contribution of zero associated with each of the n misaligned samples over the entire code epoch. In other words, it will be as if the n misaligned samples in each chip received by spread spectrum signal receiver 120 had a value of zero. The remaining N−n samples of the chip are assumed to all have the same value, which we shall denote as Nc·A1, where A1 is the magnitude of the arriving C/A code signal. After studying the teachings of this specification, one of ordinary skill in the art would appreciate that diligent algebraic manipulation will reveal that the first four cumulants ACC0, ACC1, ACC2 and ACC3 shown on the left side of the "=" sign should have the values described by the particular alignment expressions shown on the right side of the "=" sign as follows:

$ACC0 = N_C A1 (N-n)$ $ACC1 = N_C A1 (N-n)(N-n+1)/2!$ $ACC2 = N_C A1 (N-n)(N-n+1)(N-n+2)/3!$ $ACC3 = N_C A1 (N-n)(N-n+1)(N-n+2)(N-n+3)/4!$

These equations assume that the local replica code is advanced with respect to the C/A code arriving from a GNSS satellite. The resulting value of n need not have an integer value, enabling alignment to be adjusted by an amount finer than the interval between sampling points. Each cumulant is thus a function of n in the form of a polynomial of an order that is one greater than the order of the cumulant. For example, ACC0 is equal to a function of n in the form of a first-order polynomial, meaning that ACC0 varies as linear function of n. Similarly, ACC1 is equal to a function of n in the form of a second-order polynomial, ACC2 is equal to a function of n in the form of a third-order polynomial, and ACC3 is equal to a function of n in the form of a fourth-order polynomial.

Because there are only two unknowns in these alignment equations, namely the signal amplitude A1 and the misalignment n, one skilled in the art upon studying the teachings of this specification can readily solve for n to obtain a measure of the misalignment between the locally generated replica code and the direct C/A code received from the GNSS satellite. Note if the equation for ACC0 is divided by ACC1, the result is simply (N−n+1), a quantity that varies linearly with the misalignment n. Hence, in the absence of multipath, one skilled in the art upon studying the teachings of this specification can readily solve for n to obtain a measure of the misalignment between the locally generated replica code and the C/A code received from the GNSS satellite by computing only cumulants of order ACC0 and ACC1. Similar results can also be obtained by taking the ratio of any two cumulants of adjacent order. Other solution methods can also be readily derived by one of ordinary skill in the art from any arbitrary pair of such cumulants. Additional discussions regarding solving alignment equations are provided in the '278 Application, pages 14 to 18, herein incorporated by reference.

In the case where both a multipath signal and a direct path signal are present, data samples, s(k), will include a direct path signal component and a multipath signal component.

Thus, the four registers ACC0, ACC1, ACC2 and ACC3 will include values incorporating both the product of direct path signal times the replica code and the product of multipath signal times the replica code. Because a multipath signal must, of necessity, arrive after the direct path signal, the misalignment of the multipath signal with respect to the replica code may be designated by m, where m>n. Further, because the multipath signal is expected to experience greater attenuation than the direct path signal (due to factors such as a longer path length or partial absorption or reflection of the signal by buildings or other structures, for example) the amplitude of the received multipath signal may be designated by A2, where A2<A1.

Since the process of computing cumulants is entirely linear, the cumulants ACC0, ACC1, ACC2 and ACC3 obtained when two signals are present is equal to the sum of the cumulants that would have been calculated if each signal were present by itself. This means that the cumulants ACC0, ACC1, ACC2 and ACC3 determined by the method of FIG. 5 each may include a component attributable to the direct path signal, and a component attributable to a multipath signal, when a multipath signal is present. For the reasons described above, if the multipath signal is itself misaligned with the replica code by more than on chip, it will be orthogonal with respect to the replica code and thus not contribute any relevant component to cumulants ACC0, ACC1, ACC2 and ACC3.

With non-orthogonal multipath interference present, one of ordinary skill in the art upon reading this specification would appreciate that the first four cumulants ACC0, ACC1, ACC2 and ACC3 shown on the left side of the "=" sign should have the values described by the particular alignment expressions shown on the right side of the "=" sign as follows:

$$ACC0 = N_C A1(N-n) + N_C A2(N-m)$$

$$ACC1 = N_C A1(N-n)(N-n+1)/2! + N_C A2(N-m)(N-m+1)/2!$$

$$ACC2 = N_C A1(N-n)(N-n+1)(N-n+2)/3! + N_C A2(N-m)(N-m+1)(N-m+2)/3!$$

$$ACC3 = N_C A1(N-n)(N-n+1)(N-n+2)(N-n+3)/4! + N_C A2(N-m)(N-m+1)(N-m+2)(N-m+3)/4!$$

Despite the appearance of fourth-order terms in m and n, one of ordinary skill in the art upon reading this specification would appreciate after diligent algebraic manipulation that these alignment equations are readily solved with a solution that involves quadratic equations for either of the quantities N−m or N−n. The equation of interest for N−n is $$a(N-n)^2 + b(N-n) + c = 0$$

where $$a = ACC1^2/3 + ACC0 \cdot ACC1/6 - ACC0 \cdot ACC2/2$$

$$b = ACC1^2 + ACC0 \cdot ACC1/2 + 2ACC0 \cdot ACC3 - ACC1 \cdot ACC2 - 5ACC0 \cdot ACC2/2$$

$$c = 3ACC2^2 + 2ACC1^2/3 + ACC0 \cdot ACC1/3 - 2ACC0 \cdot ACC2 + 2ACC0 \cdot ACC3 - 4ACC1 \cdot ACC3$$

Thus, the alignment equations are readily solved for (N−n), through use of the quadratic equation. In solving for n, the values A2 and m associated with the multi-path signal thus drop from the alignment equations, enabling the computation of the misalignment, n, between the direct C/A code signal and the locally generated replica code. As demonstrated above, the method of FIG. 5 for determining the cumulants ACC0 to ACC3, and solving for C/A code misalignment "n" is applicable regardless of whether a multi-path signal interference is absent or present.

FIG. 6 is a flow chart illustrating an alternate method of one embodiment of the present invention. In the embodiment of FIG. 6, a chip recovery process is applied to C/A code samples as the C/A code signals arrive from the GNSS satellite (shown in block 610). In one embodiment the method of FIG. 6 is implemented by the GNSS receiver described in FIG. 1. In such an embodiment, GNSS receiver 110's memory 135 is partitioned into N memory registers (reg1 to regN), where N is equal to the number of samples produced by spread spectrum signal receiver 120 for each chip of a code epoch.

The chip recovery process of block 610 performs a partial despreading of the C/A code signal, converting the entire code epoch into a single chip-interval of data in such a way that preserves information about the relative location in each chip interval where the signal samples generated by a signal receiver were located. As used in this specification, "a partial dispreading" means that an entire code epoch of a received C/A code signal is converted into N values. The recursive progression discussed above with respect to FIG. 4 is then applied to the N values. In operation, as the signal samples for a chip are produced by spread spectrum signal receiver 120, each signal sample is received by code multiplier 130, multiplied by the current value of the replica code generated by the replica code generator 125, and sequentially stored into registers reg1 to regN in memory 135. Code samples for the remaining chips of the code epoch are similarly produced, multiplied by the corresponding value of the replica code and added to the values stored in register reg1 to regN.

In one embodiment, in the chip recovery process of block 610, when the local replica code begins a new chip, the next signal sample produced by spread spectrum signal receiver 120 is assumed to include a sampling of a new C/A code chip. When the local replica code begins a new code epoch, the next signal sample produced by spread spectrum signal receiver 120 is assumed to include a sampling of a new C/A code epoch. Using these assumptions, when a first code sample of a first chip of a code epoch is produced by spread spectrum signal receiver 120 (i.e., when the next signal sample is produced after the start of the first chip of replica code generator 125's code epoch), the signal sample is received by code multiplier 130 and multiplied by the current value of the replica code generated by the replica code generator 125. The product is stored in a first register (reg1) of memory 135. In the same way, for each subsequent signal sample received for the first chip, the signal sample is multiplied by the corresponding value of the replica code and stored sequentially into memory 135 registers with the product of the second sample stored into reg2, the third into reg3, and so forth until the Nth product is stored into register regN.

When the first signal sample including a second C/A code chip is produced by spread spectrum signal receiver 120 (that is, when the next signal sample is produced after the start of a second chip of replica code generator 125's code epoch), that sample is multiplied by the current value of the replica code and added to the current value stored in register reg1. For each subsequent signal sample produced by spread spectrum signal receiver 120 for the second chip, the sample is multiplied by the corresponding value of the replica code and sequentially added to the values stored in the registers reg2 to regN of memory 135 so that the product of the second sample of the second chip is added to the value already stored in reg2, the product of the third sample of the second chip is added to the value stored in reg3, and so forth until the product of the Nth sample of the second chip is added to the value stored in regN. This process is then repeated for each of the chips remaining in the code epoch. Once samples from all Nc chips of the code epoch are received and their resulting products stored as described above, reg1 will hold the sum of the products associated with the first sample of each chip of the code epoch, reg2 will hold the sum of the products associated with the second sample of each chip of the code epoch, and so forth.

To determine the degree of misalignment between the C/A code signal received by spread spectrum signal receiver 120 and the replica code generated by the replica code generator 125, based on the recovered chip stored in the N registers, a recursive cumulant computation is applied to the values stored in the N registers at the end of a code epoch to produce the set of multiple-order cumulants.

The method of FIG. 6 proceeds to calculate cumulants of order zero through three (ACC0, ACC1, ACC2, and ACC3), which for reasons described previously, is a sufficient number to solve for misalignment in terms of "n", either with or without the presence of a multi-path signal interference.

The method proceeds to 620 with initializing final cumulant value variables ACC0 to ACC3 to an initial value of zero. The method proceeds to 630 with establishing a loop that each cycle increments an index value k from 1 to N, where N is equal to the number of samples per chip. Within the loop, the method proceeds to 640 with reading the value stored in the kth register of reg1 to regN, (referred to below and in FIG. 6 as reg(k)). The method proceeds to 650 with calculating the value for variables ACC0 to ACC3 based on the following recursive progression:

$ACC0=ACC0+reg(k)$, then $ACC1=ACC1+ACC0$, then $ACC2=ACC2+ACC1$, then $ACC3=ACC3+ACC2$ When k is less than N (checked at block 660) the method returns to 630 to increment k and repeat blocks 640, 650 and 660 until the loop is completed. When the loop is completed, the method proceeds to 670 to equate the final cumulants ACC0 to ACC3 with associated alignment expressions and solve for misalignment, n. In the case where there is no multipath signal interference (i.e., just a direct path signal is present), the values of final cumulants ACC0, ACC1, ACC2, and ACC3 will reflect a net contribution of zero associated with each of the n misaligned samples over the entire code epoch. In other words, it will be as if the n misaligned samples in each chip received by spread spectrum signal receiver 120 had a value of zero. The remaining N−n samples of the chip are assumed to all have the same value, which we shall denote as Nc·A1, where A1 is the magnitude of the arriving C/A code signal. One of ordinary skill in the art after studying the teachings of this specification would appreciate that diligent algebraic manipulation will reveal that the first four cumulants ACC0, ACC1, ACC2 and ACC3 shown on the left side of the "=" sign should have the values described by the particular alignment expressions shown on the right side of the "=" sign as follows:

$ACC0=N_c·A1(N-n)$ $ACC1=N_c·A1(N-n)(N-n+1)2!$ $ACC2=N_c·A1(N-n)(N-n+1)(N-n+2)/3!$ $ACC3=N_c·A1(N-n)(N-n+1)(N-n+2)(N-n+3)/4!$

These equations assume that the local replica code is advanced with respect to the C/A code arriving from a GNSS satellite. The resulting value of n need not have an integer value, enabling alignment to be adjusted by an amount finer than the interval between sampling points.

There are only two unknowns in the above alignment equations formed by equating the cumulants with the alignment expressions, namely the recovered chip amplitude Nc·A1 and the misalignment n. Note if the equation for ACC0 is divided by ACC1, the result is simply (N−+1), a quantity that varies linearly with the misalignment n. Hence, in the absence of multipath, one skilled in the art upon reading this specification can readily solve for n to obtain a measure of the misalignment between the locally generated replica code and the C/A code received from the GNSS satellite by computing only cumulants of order ACC0 and ACC1. Similar results can also be obtained by taking the ratio of any two cumulants of adjacent order. Other solution methods can also be readily derived by one of ordinary skill in the art from any arbitrary pair of such cumulants. Additional discussions regarding solving alignment equations are provided in the '278 Application, pages 14 to 18, herein incorporated by reference.

In the case where both a multipath signal and a direct path signal are present, the data samples, s(k), produced by the spread spectrum signal receiver 120 will include a direct path signal component and a multipath signal component. Thus, the registers reg1 to regN will include values incorporating both the product of a direct path signal times the replica code and the product of a multipath signal times the replica code. Because the process of computing cumulants is entirely linear, the cumulants obtained for the case where two signals are present is equal to the sum of the cumulants that would have been calculated if each signal was present by itself. This means that the cumulants ACC0, ACC1, ACC2 and ACC3 determined by the method of FIG. 6 each may include a component attributable to the direct path signal, and a component attributable to a multipath signal, when a multipath signal is present. For the reasons described above, if the multipath signal is itself misaligned with the replica code by more than one chip, it will be orthogonal with respect to the replica code and thus not contribute a relevant component to cumulants ACC0, ACC1, ACC2 and ACC3.

With non-orthogonal multipath interference present, one of ordinary skill in the art upon reading this specification would appreciate that the first four cumulants ACC0, ACC1, ACC2 and ACC3 shown on the left side of the "=" sign should have the values described by the particular alignment expressions shown on the right side of the "=" sign as follows:

$ACC0=N_cA1(N-n)+N_cA2(N-m)$ $ACC1=N_cA1(N-n)(N-n+1)/2!+N_cA2(N-m)(N-m+1)/2!$ $ACC2=N_cA1(N-n)(N-n+1)(N-n+2)/3!+N_cA2(N-m)(N-m+1)(N-m+2)/3!$ $ACC3=N_cA1(N-n)(N-n+1)(N-n+2)(N-n+3)/4!+N_cA2(N-m)(N-m+1)(N-m+2)(N-m+3)/4!$

Despite the appearance of fourth-order terms in m and n, one of ordinary skill in the art upon reading this specification would appreciate after diligent algebraic manipulation that these alignment equations are readily solved with a solution that involves quadratic equations for either of the quantities N−m or N−n. The equation of interest for N−n is $a(N-n)^2+b(N-n)+c=0$ where $$a = ACC1^2/3 + ACC0 \cdot ACC1/6 - ACC0 \cdot ACC2/2$$

$$b = ACC1^2 + ACC0 \cdot ACC1/2 + 2ACC0 \cdot ACC3 - ACC1 \cdot ACC2 - 5ACC0 \cdot ACC2/2$$

$$c = 3ACC2^2 + 2ACC1^2/3 + ACC0 \cdot ACC1/3 - 2ACC0 \cdot ACC2 + 2ACC0 \cdot ACC3 - 4ACC1 \cdot ACC3$$

Thus, the alignment equations are readily solved for (N−n), through use of the quadratic equation. In solving for n, the values A2 and m associated with the multi-path signal thus drop from the alignment equations, enabling the computation of the misalignment, n, between the direct C/A code signal and the locally generated replica code. As demonstrated above, the method of FIG. 6 for determining the cumulants ACC0 to ACC3, and solving for C/A code misalignment "n" is applicable regardless of whether multi-path signal interference is absent or present.

Another advantage of embodiments of the present invention is that it provides for adjustable operating points for utilizing more or less of a C/A code signal received from a GNSS satellite. When a C/A code signal is late with respect to the local replica code, the first arriving n samples in each chip will cancel out in the cumulant process because of the code misalignment. Conversely, when the C/A code signal is early with respect to the local replica code, the last arriving n samples in each chip will cancel out in the cumulant process. In one embodiment, replica code generator maintains the local replica code a fraction of a chip early with respect to the received C/A code signal. As would be appreciated by one skilled in the art upon reading this specification, maintaining the local replica code a fraction of a chip early provides consistency with regard to choosing the proper solution of two solutions provided by solving a quadratic equation. In one embodiment, the local replica code is maintained half a chip early with respect to the received C/A code signal. This means that the first half of the chip will cancel out in the cumulant process while the second half will exhibit a constant value. This also means that an alignment mistake of up to half a chip will keep the onset of the received chip somewhere within the effective single chip operating window. This means that a GNSS receiver would only be using half of the total signal power. In another embodiment, an operating point is chosen such that the local replica code is maintained only a sample or two early with respect to the received C/A code signal. That operating point will increase the amount of the C/A code signal power used relative to the half-a-chip-early operating point. In another embodiment, the operating point is chosen to provide an earlier local replica code misalignment to begin with, in order to handle larger errors from the initial C/A code acquisition, and as tracking proceeds and the likely error gets smaller, the operating point shift to include more of the C/A code signal when there is little likelihood of the alignment error being larger than the offset of the operating point.

Several means are available to implement the systems and methods of the current invention as discussed in this specification. These means include, but are not limited to, digital computer systems, microprocessors, programmable controllers and field programmable gate arrays. Therefore other embodiments of the present invention are program instructions resident on computer readable media which when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although this specification provides specific illustrative embodiment based on a C/A code of the type generated by a GPS satellite, the scope of embodiments of the present invention is not so limited. Instead, embodiments of the present invention are applicable to processing any direct sequence spread spectrum signal (of which the C/A code signal is just one example).

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

What is claimed is:

1. A method for determining a misalignment between a global navigation satellite system spread spectrum signal and a replica code, the method comprising:
   producing code samples of a spread spectrum signal received from a satellite;
   multiplying the code samples by a current value of a replica code; and
   calculating a set of multiple-order cumulants based on the code samples multiplied by the current value of the replica code.

2. The method of claim 1, further comprising:
   equating each cumulant of the set of multiple-order cumulants to an associated alignment expression to produce a set of alignment equations; and
   solving the set of alignment equations to determine the misalignment between the spread spectrum signal and the replica code.

3. The method of claim 2, wherein solving the set of alignment equations further comprises determining the misalignment between the spread spectrum signal and the replica code in terms of a number of misaligned coarse acquisition code samples.

4. The method of claim 2, wherein solving the set of alignment equations further comprises determining the misalignment between a direct path signal component of the code samples and the replica code.

5. The method of claim 1, wherein calculating a set of multiple-order cumulants further comprises performing a recursive cumulant computation based on the data samples to produce the set of multiple-order cumulants.

6. The method of claim 1, further comprising:
   applying a chip recovery process to the code samples to despread one or more chips of a code epoch as the spread spectrum signal is received from the satellite.

7. The method of claim 1, further comprising:
   adjusting an operating point by maintaining the replica code a fraction of a chip early with respect to the code samples.

8. The method of claim 7, further comprising:
   adjusting the operating point to provide a relatively greater replica code misalignment when initially receiving the spread spectrum signal; and adjusting the operating point to provide a relatively less replica code misalignment when tracking errors decrease.

9. A global navigation satellite system receiver system, the receiver system comprising:
- a receiver adapted to receive spread spectrum signals from a global navigation satellite system and produce code samples from the spread spectrum signals, wherein the code samples are based on a sequence of code chips of a first code epoch;
- a replica code generator adapted to output a replica code based on the sequence of code chips of the first code epoch;
- a code multiplier coupled to the receiver and adapted to receive the code samples from the receiver, the code multiplier further coupled to the replica code generator and adapted to receive a current code chip value from the replica code generator, wherein the code multiplier is further adapted to generate an output based on the product of the code samples and the current code chip value; and
- a cumulant processor adapted to calculate a set of multiple-order cumulants based on the output of the code multiplier.

10. The receiver system of claim 9, wherein the cumulant processor is further adapted to solve a set of alignment equations to determine a degree of misalignment between the code samples and the replica code.

11. The receiver system of claim 9, wherein the cumulant processor is further adapted to determine a degree of misalignment between the code samples and the replica code in terms of a number of misaligned code samples.

12. The receiver system of claim 9, wherein the cumulant processor is further adapted to determine a degree of misalignment between a direct path signal component of the code samples and the replica code.

13. The receiver system of claim 9, wherein the cumulant processor is further adapted to performing a recursive cumulant computation based on the code samples to produce the set of multiple-order cumulants.

14. The receiver system of claim 9, wherein the cumulant processor is further adapted to despread one or more chips of a code epoch based on the coarse acquisition code samples received from the satellite.

15. The receiver system of claim 9, wherein the replica code generator is further adapted to vary an operating point by maintaining the replica code a fraction of a chip early with respect to the code samples.

16. A global navigation satellite system receiver system, the receiver system comprising:
- means for producing code samples of a spread spectrum signal received from a satellite;
- means for generating a replica code;
- means for multiplying the code samples by a current value of the replica code, the means for multiplying responsive to the means for producing code samples and the means for generating the replica code; and
- means for calculating a set of multiple-order cumulants, the means for calculating a set of multiple-order cumulants responsive to the means for multiplying.

17. The receiver system of claim 16, further comprising:
- means for solving a set of alignment equations to determine a misalignment between the code samples and the replica code, the means for solving a set of alignment equations responsive to the means for calculating a set of multiple-order cumulants.

18. The receiver system of claim 17, wherein the means for solving a set of alignment equations is further adapted to equate each cumulant of the set of cumulants with an associated alignment expression to produce the set of alignment equations.

19. The receiver system of claim 17, wherein the means for solving a set of alignment equations is further adapted to determine a misalignment between a direct path signal component of the code samples and the replica code.

20. The receiver system of claim 17, wherein the means for solving a set of alignment equations is further adapted to despread one or more chips of a code epoch based on the coarse acquisition code samples received from the satellite.

\* \* \* \* \*